(12) United States Patent
Hikmet et al.

(10) Patent No.: US 10,724,706 B2
(45) Date of Patent: Jul. 28, 2020

(54) OPTICAL COMPONENT FOR GENERATING A LIGHT EFFECT

(71) Applicant: SIGNIFY HOLDING B.V., Eindhoven (NL)

(72) Inventors: Rifat Ata Mustafa Hikmet, Eindhoven (NL); Paulus Albertus Van Hal, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/462,657

(22) PCT Filed: Nov. 24, 2017

(86) PCT No.: PCT/EP2017/080354
§ 371 (c)(1),
(2) Date: May 21, 2019

(87) PCT Pub. No.: WO2018/099818
PCT Pub. Date: Jun. 7, 2018

(65) Prior Publication Data
US 2019/0277475 A1  Sep. 12, 2019

(30) Foreign Application Priority Data

Dec. 1, 2016  (EP) ..................................... 16201589

(51) Int. Cl.
| | |
|---|---|
| *F21V 3/02* | (2006.01) |
| *B29C 64/118* | (2017.01) |
| *G02B 5/00* | (2006.01) |
| *B33Y 80/00* | (2015.01) |
| *F21V 3/06* | (2018.01) |

(52) U.S. Cl.
CPC .............. *F21V 3/02* (2013.01); *B29C 64/118* (2017.08); *G02B 5/003* (2013.01); *B33Y 80/00* (2014.12); *F21V 3/06* (2018.02); *G02B 2207/123* (2013.01)

(58) Field of Classification Search
CPC ................................. F21V 3/02; B29C 64/118
See application file for complete search history.

(56) References Cited

U.S. PATENT DOCUMENTS

| | | | |
|---|---|---|---|
| 6,398,370 | B1 | 6/2002 | Chiu et al. |
| 6,467,935 | B1 | 10/2002 | Schwab |
| 2011/0233593 | A1 | 9/2011 | Kawagoe et al. |
| 2013/0095302 | A1 | 4/2013 | Pettis et al. |
| 2014/0098546 | A1 | 4/2014 | Toshiba Kk |
| 2014/0160720 | A1 | 6/2014 | Seuntiens et al. |

(Continued)

FOREIGN PATENT DOCUMENTS

| | | |
|---|---|---|
| DE | 10246256 A1 | 4/2004 |
| GB | 713737 A | 8/1954 |

(Continued)

*Primary Examiner* — Joseph L Williams
(74) *Attorney, Agent, or Firm* — Daniel J. Piotrowski

(57) ABSTRACT

An optical component is disclosed including a plurality of layers, each layer comprising a first region in between a second region and a third region, the first region having a lower transmissivity than the second and third regions, wherein the layers are staggered such that the optical component comprises at least one passage defined by partially overlapping regions of higher transmissivity. A luminaire including such an optical component and a 3-D printing method for manufacturing such a component are also disclosed.

13 Claims, 14 Drawing Sheets

(56) References Cited

U.S. PATENT DOCUMENTS

| | | |
|---|---|---|
| 2015/0021628 A1 | 1/2015 | Medendorp, Jr. et al. |
| 2015/0109674 A1 | 4/2015 | Cok |
| 2015/0266235 A1 | 9/2015 | Page |
| 2016/0223156 A1 | 8/2016 | Cobb, III |

FOREIGN PATENT DOCUMENTS

| | | |
|---|---|---|
| JP | 11306838 A | 11/1999 |
| JP | 2001124846 A | 5/2001 |
| WO | 2015176960 A1 | 11/2015 |
| WO | 2017132582 A1 | 8/2017 |

OPTICAL COMPONENT FOR GENERATING A LIGHT EFFECT

CROSS-REFERENCE TO PRIOR APPLICATIONS

This application is the U.S. National Phase application under 35 U.S.C. § 371 of International Application No. PCT/EP2017/080354, filed on Nov. 24, 2017 which claims the benefit of European Patent Application No. 16201589.5, filed on Dec. 1, 2016. These applications are hereby incorporated by reference herein.

FIELD OF THE INVENTION

The present invention relates to an optical component for generating a light effect. The present invention further relates to a luminaire including such an optical component, and to a method of manufacturing such an optical component.

BACKGROUND OF THE INVENTION

There is an increasing demand for light sources, e.g. luminaires and lamp shades, which can produce an interesting visual effect. An example of such a device is disclosed in US 2015/0021628 A1, which discloses a solid state light emitting device including one or more light affecting elements (e.g., of one or more light-transmissive, light-absorptive, light-reflective, and/or lumiphoric materials) formed on, over, or around at least one solid state light emitter, with the light affecting elements including multiple fused elements embodying plurality of dots, rods, or layers such as may be formed by three-dimensional (3-D) printing. Light affecting elements may be individually tailored to individual solid state light emitters, such as to yield different optical distributions for interactions between each specific emitter and its corresponding light affecting element.

An attractive property of this device is that the light affecting elements can be formed using 3-D printing, such that the light affecting elements can be manufactured in a fast and cost-effective manner. However, the light affecting elements do not provide an aesthetically pleasing effect, e.g. by manipulating different portions of a luminous output of a solid state lighting element in a different manner. Hence, there is a need for an optical component that can be manufactured in a cost-effective manner using 3-D printing techniques and is capable of generating an aesthetically pleasing visual effect.

SUMMARY OF THE INVENTION

The present invention seeks to provide an optical component that can be manufactured in a cost-effective manner using 3-D printing techniques and is capable of generating an aesthetically pleasing visual effect.

The present invention further seeks to provide a luminaire including such an optical component.

The present invention further seeks to provide a method of manufacturing such an optical component.

According to a first aspect, there is provided an optical component having a wall with a first wall surface and a second wall surface, the second wall surface being opposite to the first wall surface in a first direction. The wall comprises a plurality of layers stacked on top of each other in a second direction perpendicular the first direction.

Each layer of the plurality of layers has a first region with a first edge surface and an opposite second edge surface, both extending through the layer in the second direction, the first edge surface being an interface between the first region and a second region, and the second edge surface being an interface between the first region and a third region, the first region having a lower transmissivity than each of the second region and the third region.

For at least some of the layers, the first edge surface is shifted with respect to the second edge surface of the next layer in the second direction, thereby creating a passage through which a light ray can pass through the wall without having to travel through the second region.

In other words, the above optical component comprises a plurality of layers, each layer comprising a transmissive portion (being at least one of the first and third regions) and a further portion (the second region) adjacent to the transmissive portion and having a lower transmissivity than the transmissive portion, wherein the portions are staggered such that the optical component comprises at least one transmissive region (referred to as the passage) that may be formed by partially overlapping transmissive portions.

The present invention is based on the realization that an optical component, or at least a part thereof, may be built up by partially overlapping, i.e. staggered, layers, thereby enabling the manufacture of the optical component using 3-D printing, wherein the further portions manipulate a portion of the luminous output generated by a light source or plurality of light sources positioned relative to the optical component, whereas the transmissive regions, e.g. transparent regions, which may be formed by a part of a transmissive portion or by partially overlapping parts of such transmissive portions allow for a further portion of the luminous output generated by the one or more light sources to pass through the optical component (relatively) unchanged. Consequently, the optical component provides angularly-dependent light effects caused by the alternating pattern of further surrounding portions that manipulate part of the luminous output of the one or more light sources and the transmissive regions, which light effects may be perceived as dynamic light effects by an observer changing his or her position, i.e. viewing angle, relative to the optical component and therefore may be perceived as particularly interesting.

Such an optical component may have any suitable shape, e.g. a planar shape in which a light source or plurality of light sources is hidden from direct view by the optical component, such as for example for a surface-mounted light source covered by the optical component. Alternatively, the optical component may comprise an inner volume, and each layer may envelope part of said inner volume. For example, each of the first, second and third regions may envelope part of said inner volume. In such an arrangement, each of the first, second and third regions may be proximal to the inner volume. Alternatively, the first, second and third regions may be alternately proximal to the inner volume to further manipulate the optical effect achieved with the optical component, either within the same layer or between subsequent layers of the stack. Such a structure may be readily achieved by certain 3-D printing techniques.

The optical component may be formed in its entirety by the stack of layers, wherein next to the first region each layer also comprises at least one of the second and third regions. Alternatively, the optical component may comprise an alternating pattern of first parts and further parts, wherein only the first parts comprise the stack of layers as defined above, and wherein the further parts are isotropically transmissive, such that the optical component comprises first parts displaying angularly-dependent optical effects and further parts that are transmissive independent of viewing angle. This for example may provide an optical component that combines functional lighting by light passing through the further parts with dynamic lighting effects by light passing through the first parts.

In the optical component according to the first aspect of the invention, each of the first regions is located in between a second region and a third region in a direction perpendicular to the stacking direction, wherein each first region has a transmissivity that is lower than that of each of the adjacent second and third regions.

In the remainder of this description, each of the second and third regions is also referred to as "a region of higher transmissivity". The first regions are part of the layer stack. The layer stack further comprises a region of higher transmissivity, so at least one of the second and third regions is also part of the layer stack. The second and third regions may both be part of the layer stack. In case only one of the second and third regions (eg. the second region) is part of the layer stack, the other region (eg. the third region) simply refers to a region of the ambient surrounding the optical component, such as a region of air. In the latter case, the first regions terminate at one of the first and second wall surfaces, while the second region or the third region (depending on which of these is also part of the layer stack) may terminate at the other of the first and second wall surfaces.

If, next to the first regions, the layer stack only comprises one of the second and third regions, wherein each of the two regions comprised in the layer stack terminate at a wall surface, successive layers of the layer stack are staggered with respect to each other. Each first region may have a defined width, wherein successive layers are staggered with respect to each other by a distance that is larger than the defined width of the first region. This ensures that a part of a region of higher transmissivity is arranged in between first regions of successive layers, which part may form the passage that allows a light ray to pass through the wall without having to travel through a first region.

As mentioned above, the first region of each layer may terminate at one of the first and second wall surfaces and thereby define an edge of the layer. Alternatively, the first region of each layer may be an intermediate region of the layer, located in between second and third regions that are both also part of the layer.

The respective edges of the layers may have sharp corners or rounded corners. The shape of the corners of the edges may be chosen based on a desired optical function of the optical component as differently shaped corners will have a different interaction with incident light generated by the one or more light sources within the inner volume of the optical component.

The first regions of the optical component are used to manipulate incident light such as to create a visible difference between the first regions and the transmissive passages of the optical component through which a light ray can pass through the wall without having to travel through the first region. Any suitable type of optical manipulation may be contemplated for this purpose. For example, each first region may be individually selected from a coloured region, a reflective region, a diffuse region, an transmissive outer region surrounding a transmissive inner region having a different refractive index to the outer region. In a particular embodiment, the respective surrounding outer regions are the same.

The respective layers may all have the same dimensions, e.g. the same thickness, width and length. In this manner, a regular pattern of first regions may be formed if the respective layers are staggered in the same manner. However, in alternative embodiments, the respective layers may have different dimensions in order to adjust the pattern of first regions, for example to create a more irregular pattern.

The respective layers may all be made of the same material or combination of materials in case the first region and the second and/or regions of each layer are made of different materials, thereby giving the optical component a homogeneous appearance. However, in alternative embodiments, different layers may be made of different materials in order to give the optical component or heterogeneous appearance, which may be considered aesthetically pleasing in some application domains.

According to a second aspect, there is provided a luminaire comprising the optical component according to the first aspect. Such a luminaire, which may further comprise one or more light sources, provides an aesthetically pleasing effect to an observer, which optical effect is particularly interesting due to the angular dependence of the created optical effect.

In such a luminaire, the optical component may comprise an inner volume, e.g. may define (part of) a lampshade or the like, with the luminaire further comprising a light source positioned inside or outside said inner volume.

According to a third aspect, there is provided a method of manufacturing the optical component according to the first aspect. The method comprises the step of 3-D printing the plurality of layers with an extruder nozzle.

The ability to manufacture the optical component according to embodiments of the present invention using 3-D printing ensures that the optical component can be produced in a fast and cost-effective manner, in particular when the 3-D printing comprises fused deposition modelling, which is known to facilitate the manufacture of complex 3-D objects.

The 3-D printing may comprise forming an inner volume of the optical component by enveloping each layer around part of said inner volume. For example, each first region and each of the second and/or third regions may envelope part of said inner volume. In such an arrangement, a region of higher transmissivity (the second or third region) may be proximal to the inner volume or the first region may be proximal to the inner volume. In an embodiment, the 3-D printing comprises forming each layer such that in each layer the first region and a region of higher transmissivity (the second or third region) are alternately proximal to the inner volume. This for example may be achieved using dual nozzle printing techniques in which the nozzles are rotated (relative to each other) as is well-known per se.

In an embodiment, the 3-D printing comprises printing the first region and a region of higher transmissivity of each layer with an extruder nozzle having two nozzles.

Alternatively, the 3-D printing comprises sequentially printing the first region and a region of higher transmissivity of each layer with the extruder nozzle, wherein the extruder nozzle has a first feeder for forming the first region and a second feeder for forming the region of higher transmissivity.

The optical component may be formed by rotating the substrate onto which the respective layers are printed although preferably the one or more extruder nozzles are rotated during the 3-D printing of a layer in order to form the layers.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1A:
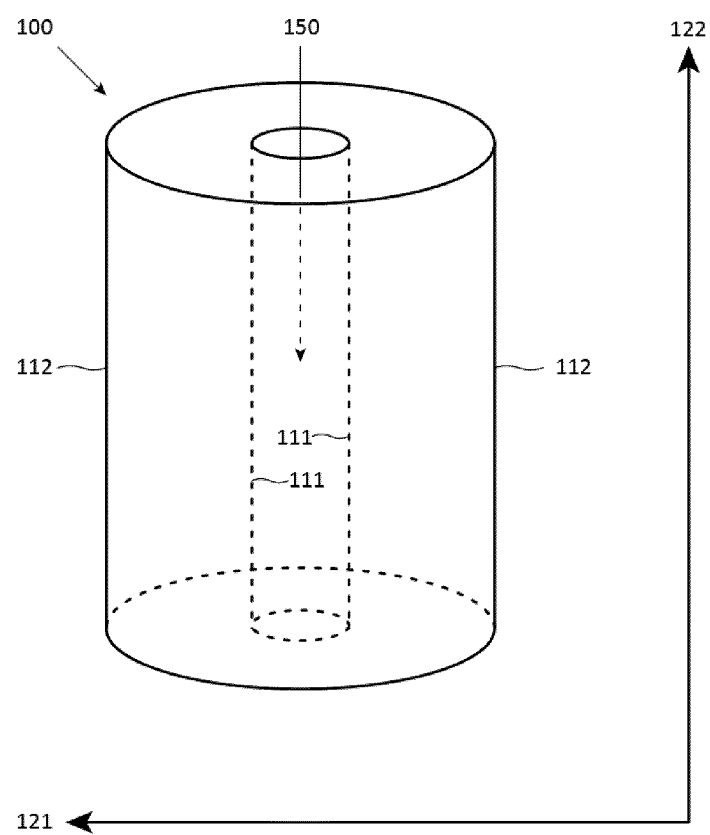
FIGS. 1A and 1B schematically depict a perspective view of an optical component, and three views of the same cross section of the optical component, respectively.

It should be understood that the Figures are merely schematic and are not drawn to scale. It should also be understood that the same reference numerals are used throughout the Figures to indicate the same or similar parts.

Figure 1B:
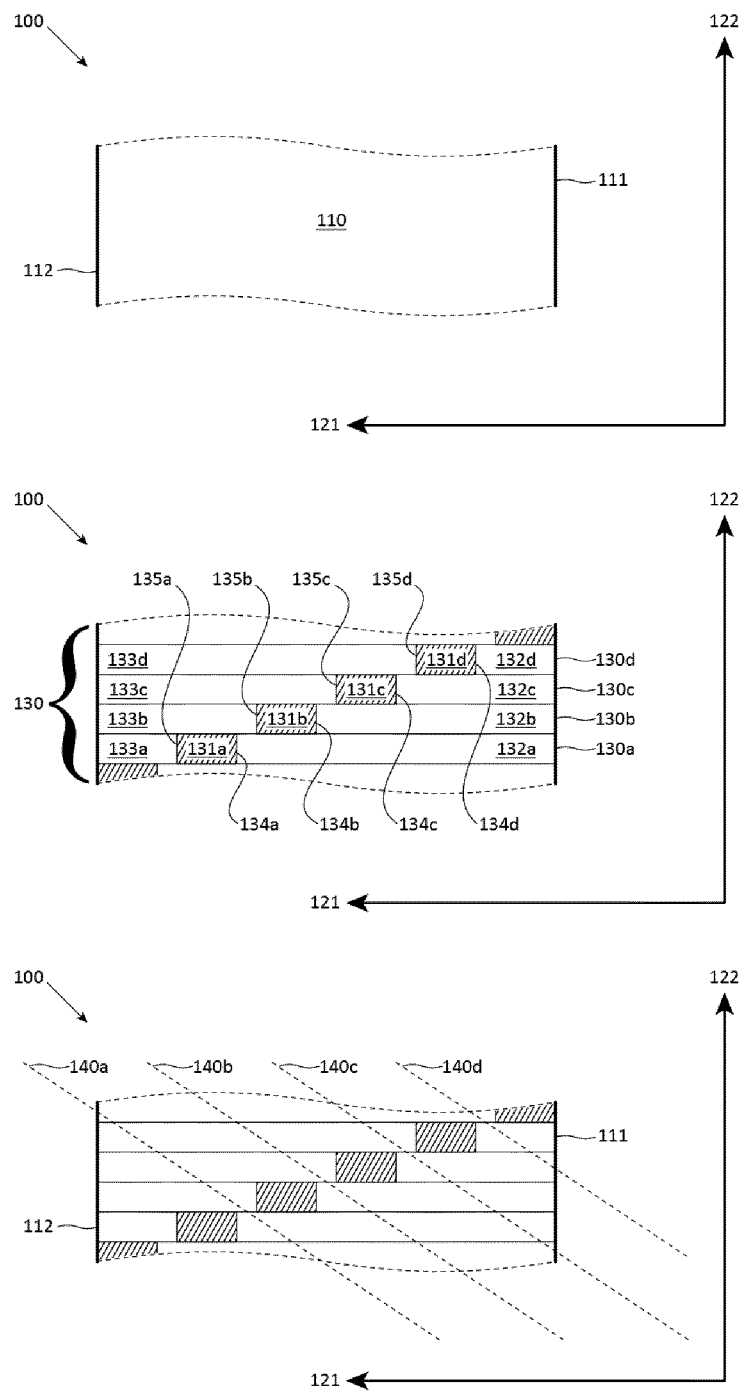

FIG. 1A schematically depicts a perspective view of optical component 100, and FIG. 1B schematically depicts three views of the same cross section of the optical component 100.

FIG. 1A shows the first wall surface 111 and the second wall surface 112. The first wall surface 111 faces inner volume 150 that is enclosed by the wall 110 of optical component 100, which has the form of a hollow circular cylinder. The first wall surface 111 and the second wall surface 112 are opposite each other in first direction 121, and parallel to each other in second direction 122, which is perpendicular to first direction 121.

The upper view of FIG. 1B shows a cross section of the wall 110, again illustrating the first wall surface 111 and the second wall surface 112, wherein the first wall surface 111 is opposite to the second wall surface 112 in the first direction 121. For the sake of clarity, the cross section only shows one half of the optical component 100.

The middle view of FIG. 1B is the same cross section as illustrated in the upper view of FIG. 1B, but now shows the plurality of layers 130 that are stacked on top of each other in the second direction 122 perpendicular to the first direction 121. In the remainder of this description, the second direction 122 is also referred to as "the stacking direction".

Each of the layers 130a-d of the plurality of layers 130 forms a closed structure that surrounds or envelopes a portion of the inner volume 150 of the optical component 100. This inner volume 150 may be used for positioning one or more light sources relative to the optical component 100.

The middle view of FIG. 1B also shows, for each layer 130a-d of the plurality of layers 130, a first region 131a-d, located between a second region 132a-d and a third region 133a-d in the first direction 121 (i.e. perpendicular to the stacking direction).

Each of the second regions 132a-d and the third regions 133a-d has a higher transmissivity than the first regions 131a-d. The second regions 132a-d and the third regions 133a-d may be made from the same material, or from different materials. The second regions 132a-d terminate at the first wall surface 111, and the third regions 133a-d terminate at the second wall surface 112.

Each of the first regions 131a-d has a first edge surface 134a-d and a second edge surface 135a-d, both of which extend through the layer 130a-d in the second direction 122. The second edge surfaces 135a-d are opposite to the first edge surfaces 134a-d in the first direction 121. The first edge surfaces 134a-d are facing the first wall surface 111, and each of them is an interface with a second region 132a-d. The second edge surface 135a-d are facing the second wall surface 112, and each of them is an interface with a third region 133a-d.

For each layer 130a-d, the first edge surface 134a-d is shifted with respect to the second edge surface of the next layer in the second direction 122. In other words, the layers 130a-d are stacked on top each other in such a way that the first regions 131a-d are staggered relative to each other, and non-overlapping in the stacking direction (direction 122).

The lower view of FIG. 1B again shows the stack of layers that is comprised in the wall, and the first, second, and third regions that are present in each of these layers. For the sake of intelligibility, the reference numerals for the aforementioned features have been deliberately omitted from the lower view of FIG. 1B. This view now also shows the passages 140a-d that are present in the optical component 100, and that allow a light ray to pass through the wall of the optical component 100 without having to travel through the second regions 132a-d.

Figure 2A:
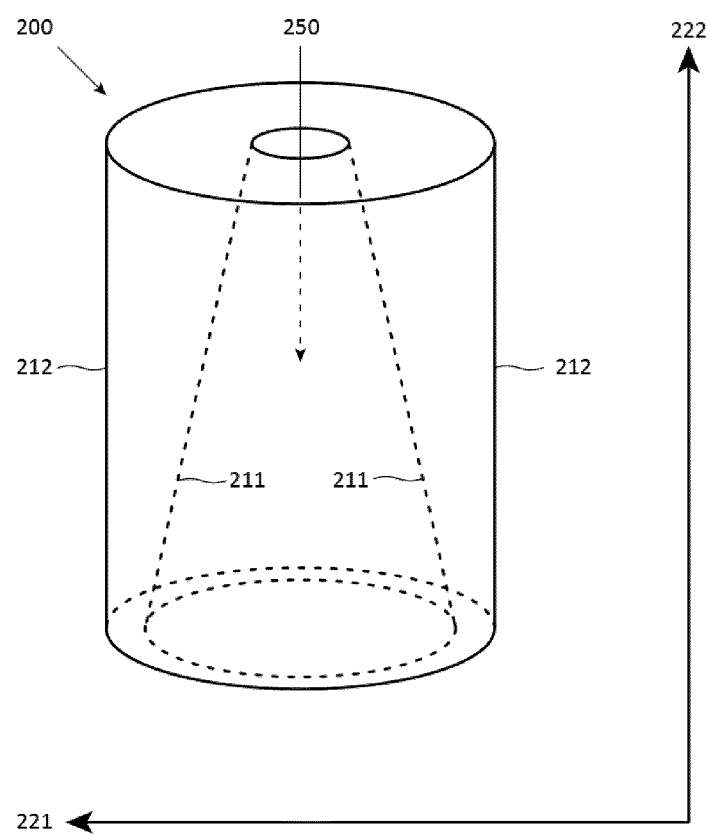
FIGS. 2A and 2B schematically depict a perspective view of an optical component, and three views of the same cross section of the optical component, respectively.
Figure 2B:
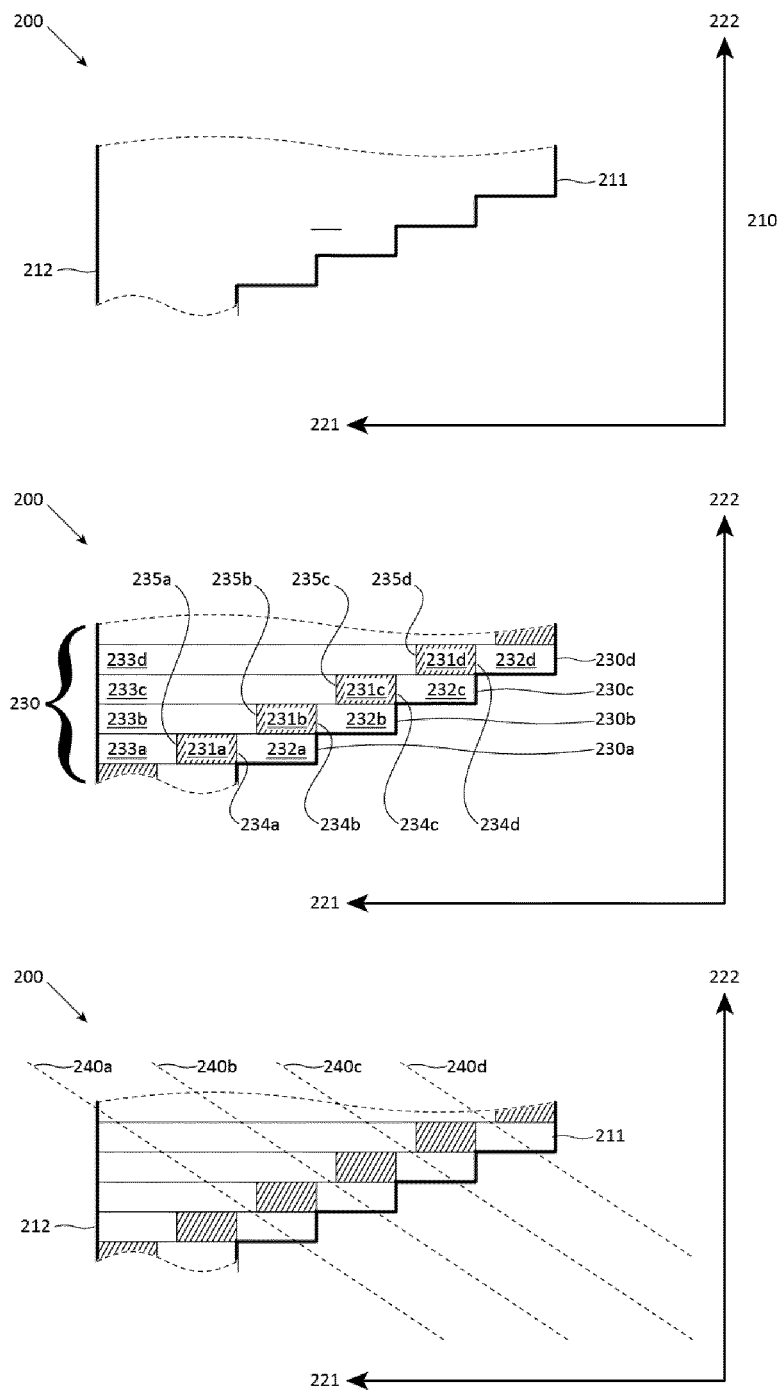

FIG. 2A schematically depicts a perspective view of optical component 200, and FIG. 2B schematically depicts three views of the same cross section of the optical component 200.

FIG. 2A shows the first wall surface 211 and the second wall surface 212. The first wall surface 211 faces inner volume 250 that is enclosed by the wall of optical component 200. The first wall surface 211 and the second wall surface 212 are opposite each other in the first direction 221. The second wall surface 212 is oriented parallel to the stacking direction (second direction 222), while the first wall surface 211 is inclined with respect to the stacking direction, so that the optical component 200 has the shape of a hollow circular cylinder with an inner diameter that decreases in the stacking direction.

The three views of FIG. 2B are similar to those already described in relation to FIG. 1B.

The first regions 231a-d all have substantially the same dimensions, and the second regions 232a-d all have substantially the same dimensions. The second regions 232a-d terminate at the first wall surface 211, and the third regions 233a-d terminate at the second wall surface 212.

For each layer 230a-d, the first edge surface 234a-d is shifted with respect to the second edge surface of the next layer in the second direction 222. In other words, the layers 230a-d are stacked on top each other in such a way that the first regions 231a-d are staggered relative to each other, and non-overlapping in the stacking direction (direction 122).

The lower view of FIG. 2B shows the passages 240a-d that are present in the optical component 200, and that allow a light ray to pass through the wall of the optical component 200 without having to travel through the first regions 231a-d.

Figure 3A:
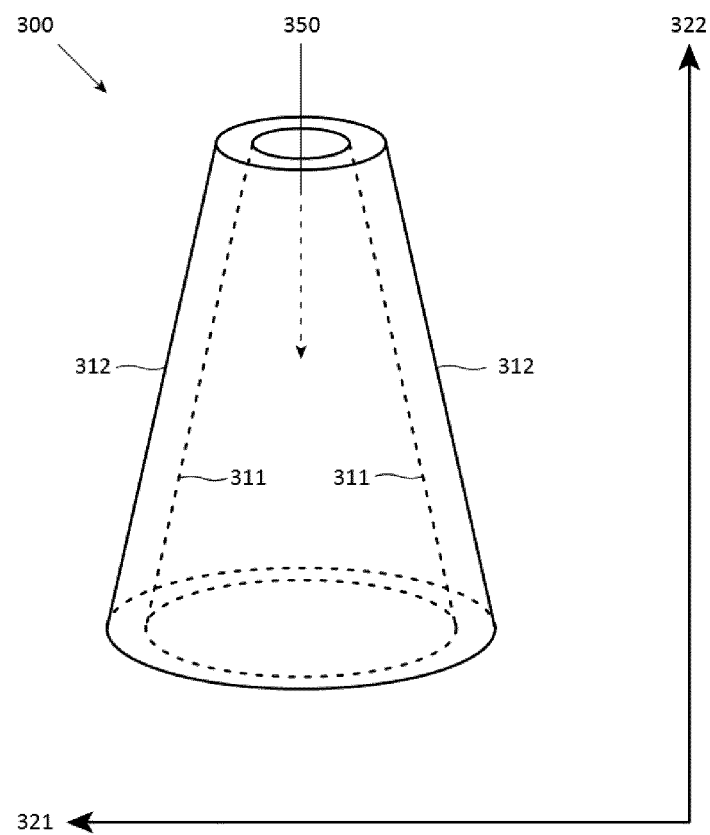
FIGS. 3A and 3B schematically depict a perspective view of an optical component, and three views of the same cross section of the optical component, respectively.
Figure 3B:
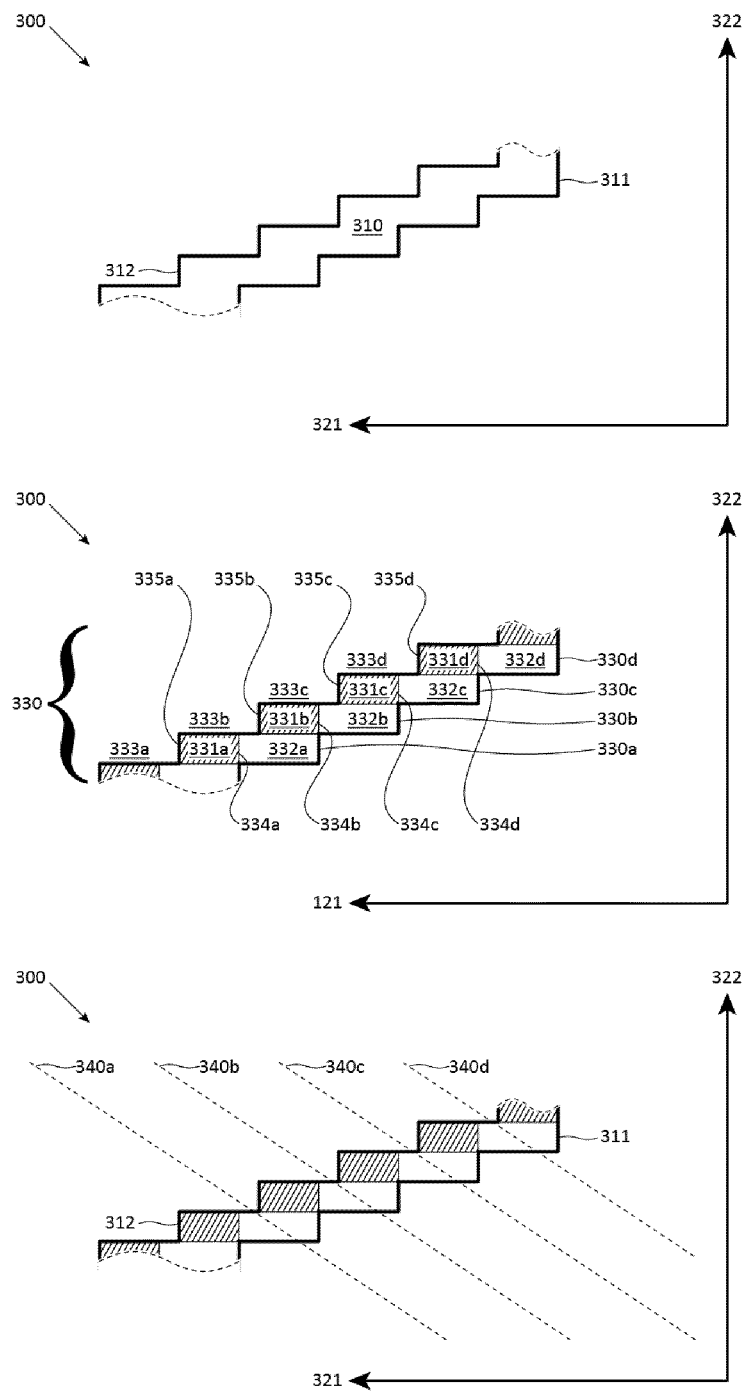

FIG. 3A schematically depicts a perspective view of optical component 300, and FIG. 3B schematically depicts three views of the same cross section of a optical component 300.

FIG. 3A shows the first wall surface 311 and the second wall surface 312. The first wall surface 311 faces inner volume 350 that is enclosed by the wall of optical component 300. The first wall surface 311 and the second wall surface 312 are opposite each other in first direction 321. The second wall surface 312 is oriented parallel to the first wall surface 211 while both are inclined with respect to the stacking direction. In other words, the optical component 300 has the shape of a hollow truncated cone.

Again, the three views of FIG. 3B are similar to those already described in relation to FIG. 1B.

The first regions 331a-d all have substantially the same dimensions, and the second regions 332a-d all have substantially the same dimensions. The first regions 331a-d terminate at the second wall surface 312, and the second regions 332a-d terminate at the first wall surface 311. This means that for the optical component 300, the third regions 333a-d are not part of the layers 330a-d, and also not of the optical component 300 as a whole. Instead, the third regions 333a-d are regions of the ambient (air) that is present adjacent to the second wall surface 312.

For each layer 330a-d, the first edge surface 334a-d is shifted with respect to the second edge surface of the next layer in the second direction 322. In other words, the layers 330a-d are stacked on top each other in such a way that the first regions 331a-d are staggered relative to each other, and non-overlapping in the stacking direction (direction 322).

The lower view of FIG. 3B shows the passages 340a-d that are present in the optical component 300, and that allow a light ray to pass through the wall of the optical component 300 without having to travel through the first regions 331a-d.

Figure 4:
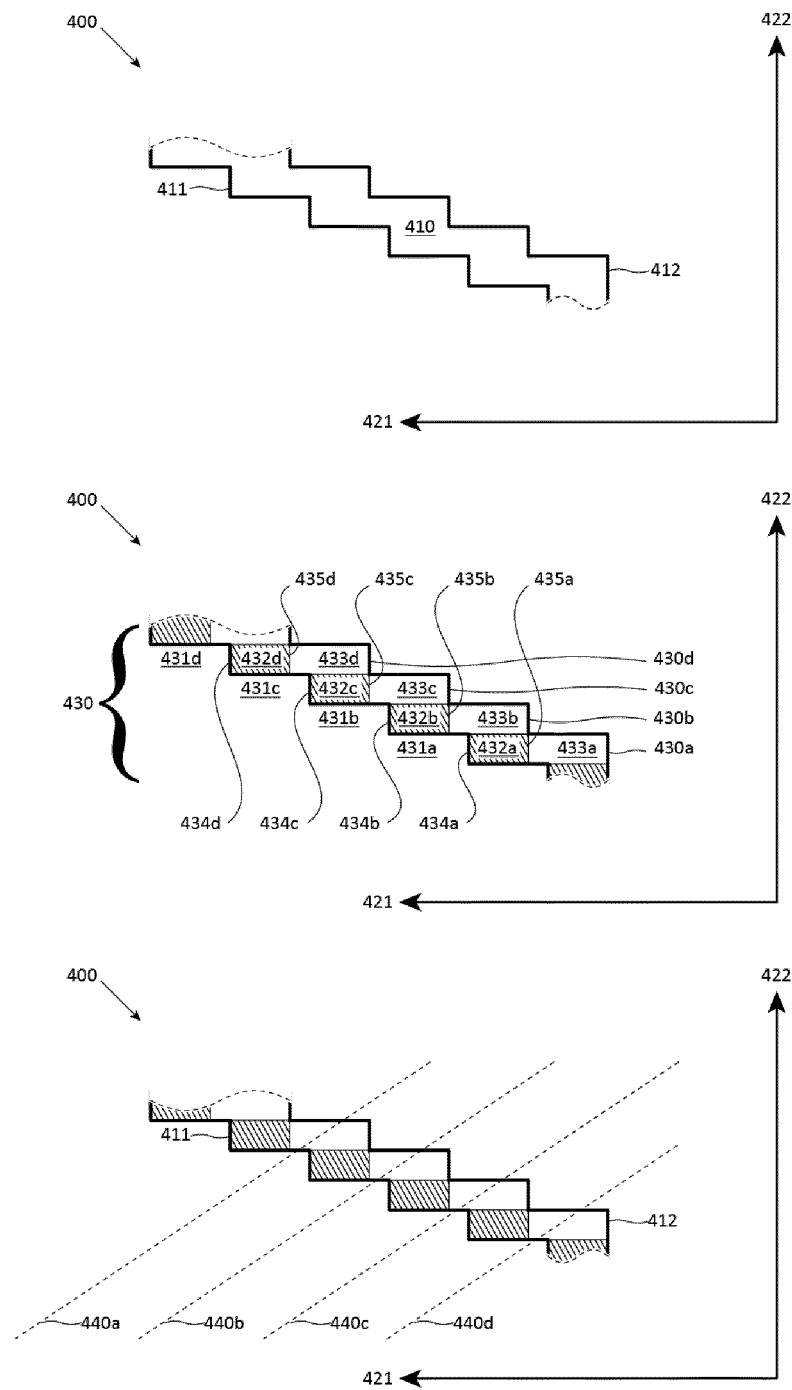
FIG. 4 schematically depicts three views of the same cross section of an optical component.

FIG. 4 schematically depicts three views of the same cross section of optical component 400.

The first regions 431a-d all have substantially the same dimensions, and the third regions 433a-d all have substantially the same dimensions. The first regions 431a-d terminate at the first wall surface 411, and the third regions 433a-d terminate at the second wall surface 412. This means that for the optical component 400, the first regions 431a-d are not part of the layers 430a-d, and also not of the optical component 400 as a whole. Instead, the first regions 431a-d are regions of the ambient (air) that is present adjacent to the second wall surface 312.

For each layer 430a-d, the first edge surface 434a-d is shifted with respect to the second edge surface of the next layer in the second direction 422. In other words, the layers 430a-d are stacked on top each other in such a way that the first regions 431a-d are staggered relative to each other, and non-overlapping in the stacking direction (direction 422).

The lower view of FIG. 4 shows the passages 440a-d that are present in the optical component 400, and that allow a light ray to pass through the wall of the optical component 400 without having to travel through the first regions 431a-d.

The optical component 300 is formed of a plurality of partially overlapping layers 330a-d such that the layers 330a-d are staggered, thereby forming a stepped profile, here on the first wall surface 311 as well as on the second wall surface 312 of the optical component 300 although it should be understood that depending on the preferred shape, none of the first and second wall surfaces has a stepped profile (as is the case for optical component 100 illustrated in FIGS. 1A and 1B), or a stepped profile may be formed on only one of the first and second wall surfaces (as is the case for optical component 200 illustrated in FIGS. 2A and 2B). As will be explained in more detail below, the staggering of the plurality of layers 300 may be readily achieved using 3-D printing techniques, in particular with fused deposition modelling (FDM) printers. Such techniques make it possible to form particularly thin layers 330a-d, e.g. having a thickness of less than 2 mm, thereby ensuring that the details (the stepped profile) of the staggered layers 330a-d cannot be observed from a typical observation distance from the optical component 300 when in use, such as a distance of 1 m or more when the optical component 300 is used as a lampshade such as a pendant lamp shade or a lampshade mounted on a pole-based floor-mounted luminaire by way of non-limiting example.

Figure 5:
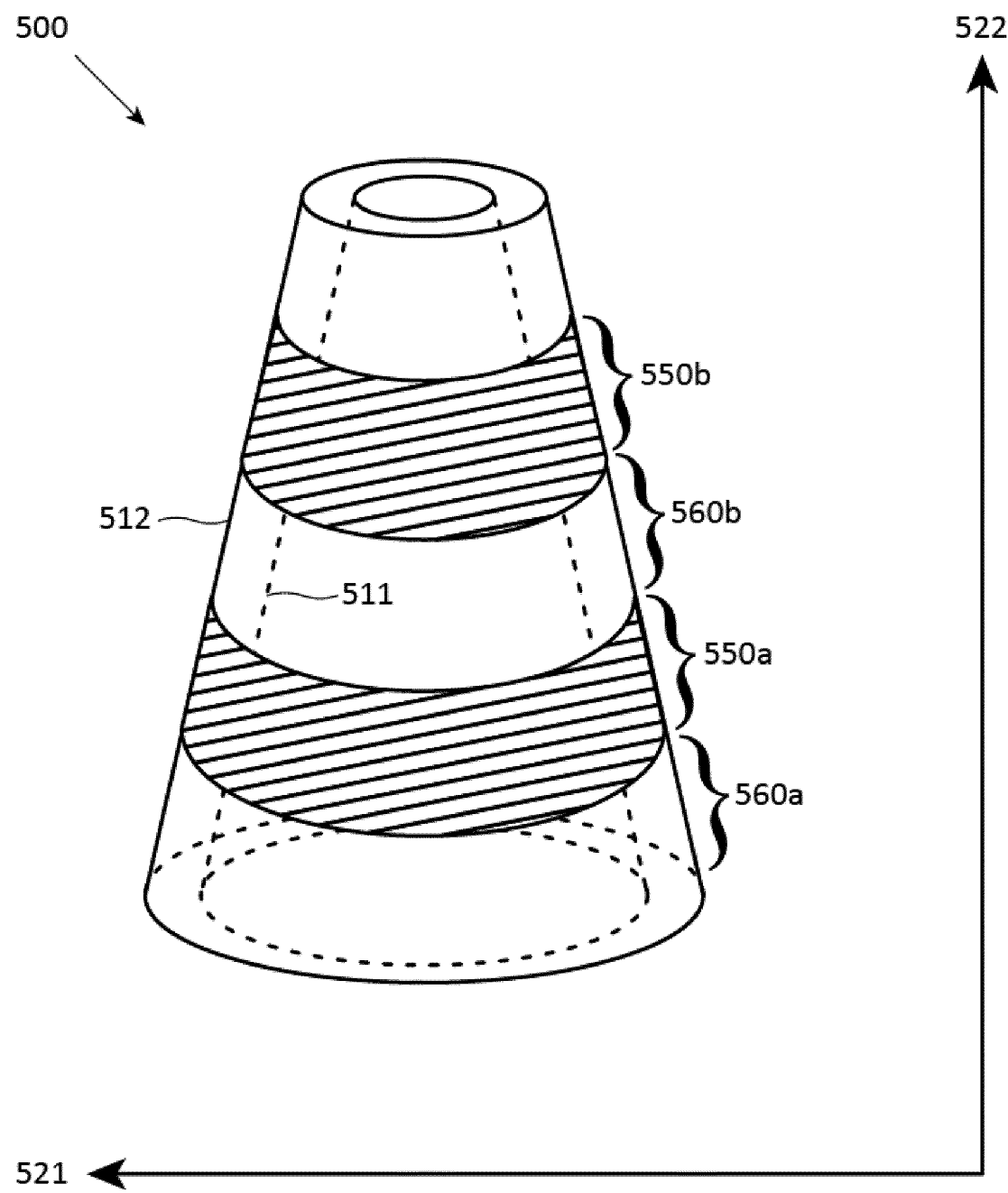
FIG. 5 schematically depicts a perspective view of an optical component.

The optical component of the present invention may be formed in its entirety of such staggered layers as described above in relation to FIGS. 3 and 4. An alternative is illustrated in FIG. 5, wherein optical component 500 is shown that comprises an alternating pattern of first parts 550a-b built up by staggered layers as described in relation to FIGS. 3 and 4, and second parts 560a-b, such as transparent parts, which may be formed in any suitable manner, e.g. as a single layer of a transparent polymer material. In such an alternating pattern, the first parts 550a-b may be used to create angularly-dependent optical effects as will be explained in more detail below whereas the second parts 560a-b do not exhibit such angularly-dependent optical effects. This for example may be utilised in application domains in which the optical component 500 is to provide functional lighting in combination with dynamic lighting effects, in which the functional lighting is provided by the second parts 560a-b and the dynamic lighting effect is provided by the first parts 550a-b, in particular when an observer of the optical component 500 changes his or her orientation relative to the optical component 500.

The optical component according to the invention may form an open structure, e.g. a planar or curved structure that is at least partially built up by the stack of layers as described hereinbefore. For example, the optical component may be used as a cover or the like over a surface-mounted, e.g. wall-mounted or ceiling-mounted light source arrangement to create the desired optical effect to an observer looking at the optical component.

In an alternative embodiment, each of the layers forms a closed structure that surrounds or envelopes a portion of an inner volume of the optical component, which inner volume may be used for positioning one or more light sources relative to the optical component, e.g. within the inner volume or outside the inner volume, such that the optical effect may be observed by looking into the inner volume. Any suitable type of light source may be used for this purpose, such as an incandescent or fluorescent light source or a solid state light source such as one or more LEDs, which may be white light LEDs, coloured LEDs or combinations thereof. The closed structure formed by each of the layers may have any suitable shape, e.g. a continuous shape such as an annular shape or an ellipsoid shape, or a discontinuous shape such as a polygonal shape, e.g. a triangular shape, rectangular shape, and so on. In an example embodiment, the layers are staggered such that the staggered layers form a truncated conical optical component, which for example may be useful if the optical component is to be used as a lampshade such as a pendant lamp shape. However, it should be understood that depending on the intended application of the optical component, the layers may have different shapes and not each layer may have the same shape, i.e. different layers may have different shapes, such that the optical component may have any suitable shape.

At least some of the layers, and preferably each of the layers, comprises a region of higher transmissivity that is a closed structure surrounding part of an inner volume of the optical component and forms part of the layer and the first region adjacent to the region of higher transmissivity that is a closed structure surrounding part of the inner volume of the optical component and forms another part of the layer.

Figure 6:
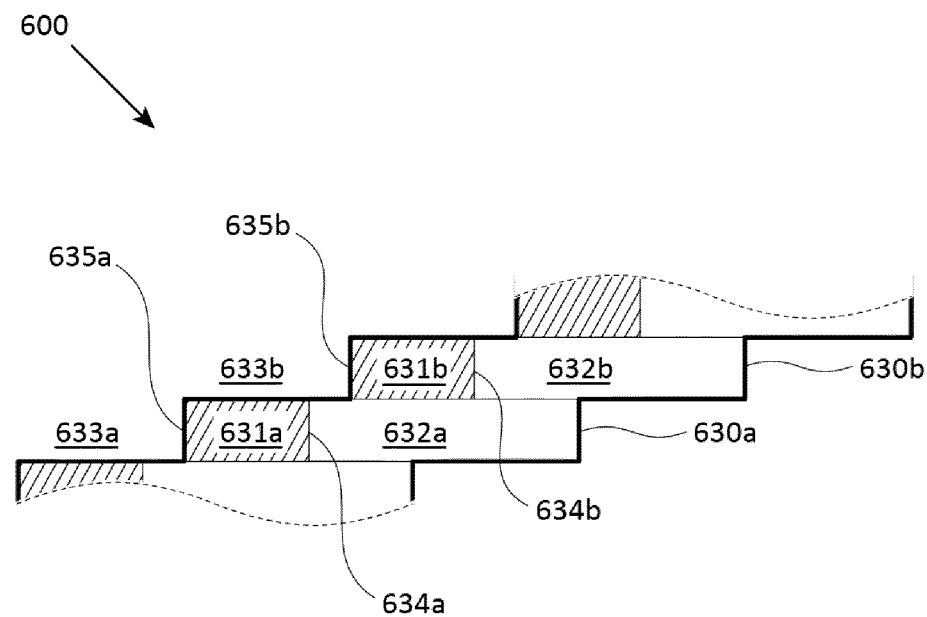
FIG. 6 schematically depicts two views of the same cross section of an optical component.
Figure 6:
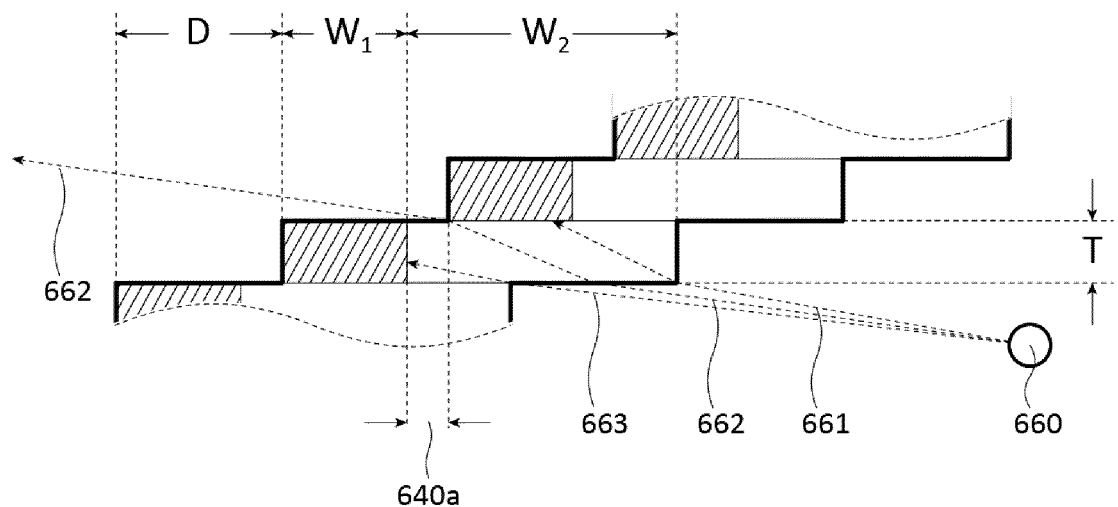

FIG. 6 shows a vertical cross-section of optical component 600, similar to optical component 300 as illustrated in FIG. 3. The layers 630a-b are staggered such that the first regions 631a-b of adjacent layers 630a-b are non-overlapping. In other words, each first region 631a-b has a defined width W1, being the distance between first edge surface 634a-b and second edge surface 635a-b, and a distance D between the second edge surface 635a-b and a second edge surface of a first region of an adjacent layer, wherein the distance D exceeds the defined width W1, as can be seen in the lower view of FIG. 6. This ensures that each pair of neighbouring first regions 631a-b are spatially separated by a transmissive passage, which transmissive passage may be formed by part of a second region 632a-b or by a stack of parts of second regions 632a-b of layers 630a-b staggered on top of each other. Consequently, a pattern of first regions 631a-b is formed in the optical component 600, which first regions 631a-b are separated by transmissive passages formed by partially overlapping second regions 632a-b. Preferably, each layer 630a-b has a first region 631a-b and an adjacent second region 632a-b, i.e. the first region 631a-b and the second region 632a-b are arranged next to each other in a direction perpendicular to the direction wherein the layers 630a-b are staggered on top of each other.

In the optical components 100, 200 and 300 as illustrated in FIGS. 1, 2, and 3, respectively, the layers are provided such that the a region of higher transmissivity (in these case the second regions) are proximal to the inner volume of the optical component. As is clear from FIG. 4, it should however be understood that it is equally feasible that the regions of higher transmissivity are distal to the inner volume of the optical component, i.e. that the first regions are proximal to the inner volume.

Moreover, the layers do not need to be continuous in the sense that the same portion of the layer is proximal to the inner volume over the full length of the layer. This is schematically depicted in FIG. 7, which shows optical component 700, having a wall 710 with first wall surface 711 and second wall surface 712.

Each layer 730a-b has a first region 731a-b located between a second region 732a-b and a third region 733a-b, wherein each of the second region 732a-b and the third region 733a-b has a higher transmissivity than the first region 731a-b. The first region 731a-b has a first edge surface 734a-b facing the first wall surface 711 and a second edge surface 735a-b facing the second wall surface 712.

Figure 7:
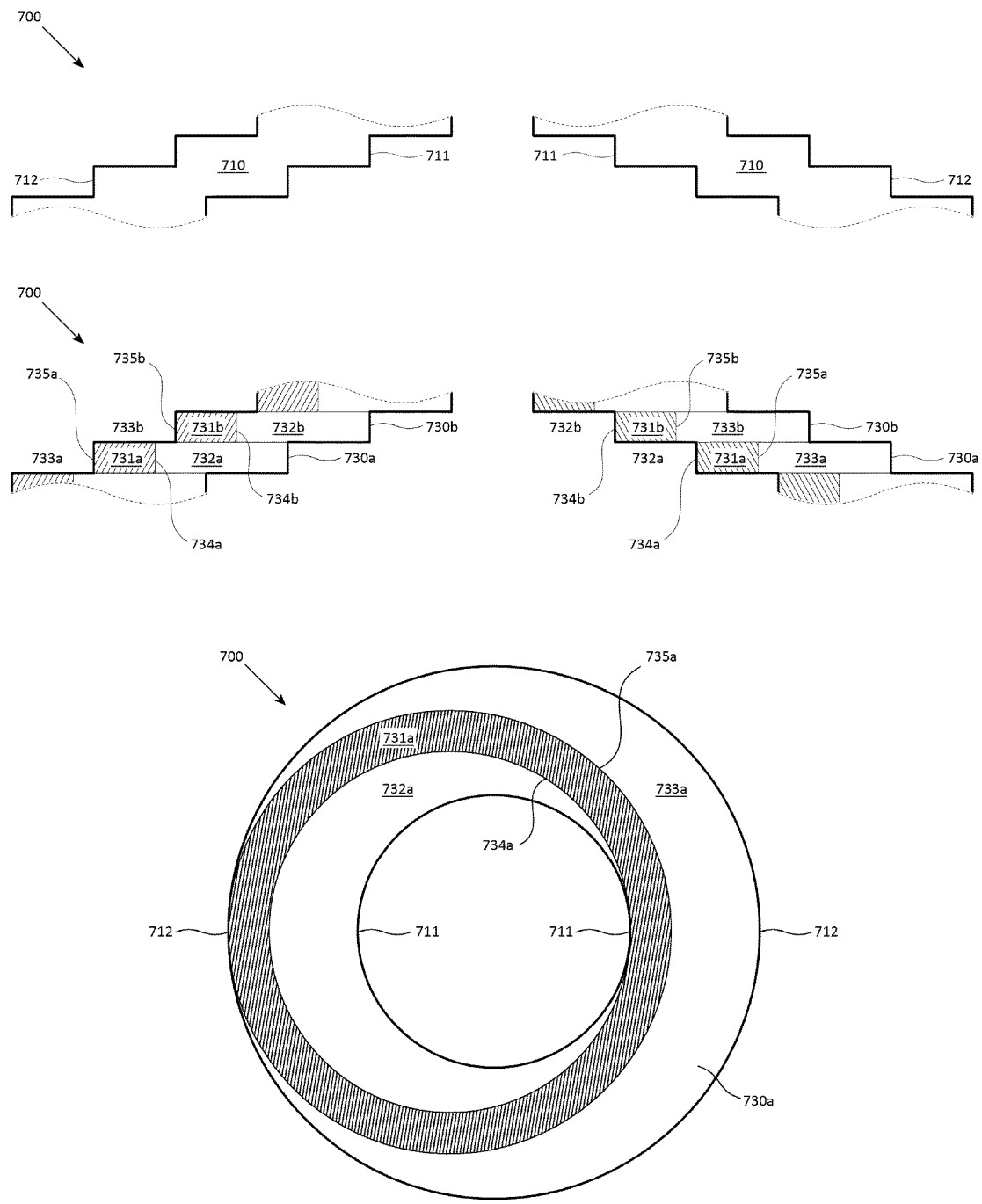
FIG. 7 schematically depicts two views of the same cross section of an optical component, and a top view of a layer of the optical component.

The lower view of FIG. 7 shows a cross section through layer 730a in a direction perpendicular to the stacking direction. The cross section of the layer 730a has the shape of a ring. The cross section of the first region 731a also has the shape of a ring, but of a smaller diameter and width, and positioned off-center compared to the layer 730a. At one side of the layer 730a, the first region 731 terminates at the first wall surface 711, while at the opposite side of the layer 730a it terminates at the second surface 712. In between these opposite locations, the second region 732a terminates at the first wall surface 711 and the third region 733a terminates at the second wall surface 712. In the optical component 700, each layer 730a-b comprises a first portion in which the second region 712a-d is proximal to the first wall surface, and a second portion in which the first region 731a-b is proximal to the first wall surface.

For layer 730a the first edge surface 734a is shifted with respect to the second edge surface 735b of the next layer 730b in the stacking direction, thereby creating a passage through which a light ray can pass through the wall 710 without having to travel through the first region 731a.

A configuration as illustrated in FIG. 7 may be readily achieved by moving a fixed arrangement of a pair of nozzles (for printing the first regions 731a-b and the regions of higher transmissivity simultaneously) in a circular motion substantially perpendicularly to a surface on which the respective portions are deposited, thereby forming two interleaving circles in which the cross sections as shown on the left and right in the upper and middle views of FIG. 7 are separated by cross-over regions.

The first regions of each layer have a lower transmissivity than the first and third regions of such a layer in order to create a different interaction with light generated by a light source within or outside the inner volume. This will be explained in more detail with the aid of FIG. 6, which schematically depicts part of an optical component 600 according to an embodiment in a cross-sectional view, wherein a light source 660 is positioned in the inner volume of the optical component 600. The light source 660 typically generates light rays under different angles, here symbolically depicted by light rays 661-663, from which it can be seen that rays emitted under different angles have a different interaction with the optical component 600. For example, light rays in an angular range including light ray 661 as well as light rays in an angular range including light ray 663 are incident on a first region 631a-b and will therefore be manipulated differently compared to light rays in an angular range including light ray 662, which may travel substantially unimpeded through the second region 632a. Consequently, the optical component 600 generates an angularly-dependent light effect, which can change as a result of a viewing angle under which the optical component 600 is observed, such that the optical component 600 may create what may be perceived as a dynamic optical effect that is aesthetically pleasing and/or of interest.

In an embodiment, the regions of higher transmissivity may be transparent, with the respective first regions being less transparent than the surrounding regions of higher transmissivity. For example, the first regions may be partially or totally absorbent or reflective. More specifically, the first regions may be coloured, reflective, diffuse or emissive. Alternatively, the first regions may be transmissive but have a different refractive index to the regions of higher transmissivity. It should be understood that not all first regions have to be the same, it is equally feasible that different first regions have different optical properties, for example to create more intricate or complex optical effects with the optical component.

More generally speaking, each of the layers may have two regions that are optically different with respect to each other, one being more transmissive than the other. The difference in the optical properties of the regions may be in terms of scattering characteristics (scattering angle), reflection characteristics, refractive index and luminescence as well as in terms of absorption and colour characteristics.

In the context of the present application, where reference is made to a region of higher transmissivity (a second and/or third region), such a region comprises a material that, when having a thickness of 1 mm, transmits more than 5% and preferably transmits more than 20% of the light falling onto it. Such regions of higher transmissivity may be transparent, may have a coloured appearance, may be luminescent and/or may be reflective in some embodiments.

As schematically depicted in FIG. 6, each layer 630a-b has a thickness T, which preferably is below 2 mm as previously explained, and a total width formed by the combined width of the second region 632a-b having a width W2 and the first region 631a-b having a width W1. In an embodiment, each layer 630a-b of the optical component 600 has the same thickness T and total width, which when combined with each layer 630a-b staggering another layer 630a-b by the same degree yields a regular pattern of first regions 631a-b separated by passages formed by partially overlapping second regions 632a-b, which passages allow light rays to pass through the wall of the optical component 600 without having to travel through a first region 631a-b.

However, it should be understood that it is equally feasible to create irregular patterns in the optical component, for example by different layers having different dimensions such as a different thickness T and/or a different total width, and/or by varying the degree of staggering between the respective layers forming the optical component. Similarly, different layers may have differently dimensioned regions of higher transmissivity and/or first regions. The dimensions of T, W1, W2 and D may be individually chosen for each layer and pair of layers in order to tune the optical properties of the optical component.

Also, the shape of the layers may be controlled to tailor the optical effects created with the optical component. For example, as schematically depicted in FIG. 6, each layer 630a-b has relatively sharp edges at their opposite ends, but the shape of these edges may be tailored in accordance with the desired optical effect to be created. For example, opposing ends of the respective layers may have rounded edges. The layers including the first regions and the regions of higher transmissivity may be manufactured and assembled in any suitable manner. In a preferred embodiment, the optical component may be manufactured using a 3-D printing technique such as fused deposition modeling (FDM) printing. FDM printers use a thermoplastic filament, which is heated to its melting point and then extruded, layer by layer, to create a three dimensional object. FDM printers are relatively fast, low cost and can be used for printing complicated 3D objects. Such printers may be used for printing various shapes using various polymers, as is well-known per se.

To perform a 3D printing process, the printer is controlled using a print command file generated by computer aided design (CAD) software specifying the 3-D shape of the optical component, and this controls how the filament is processed.

Figure 8:
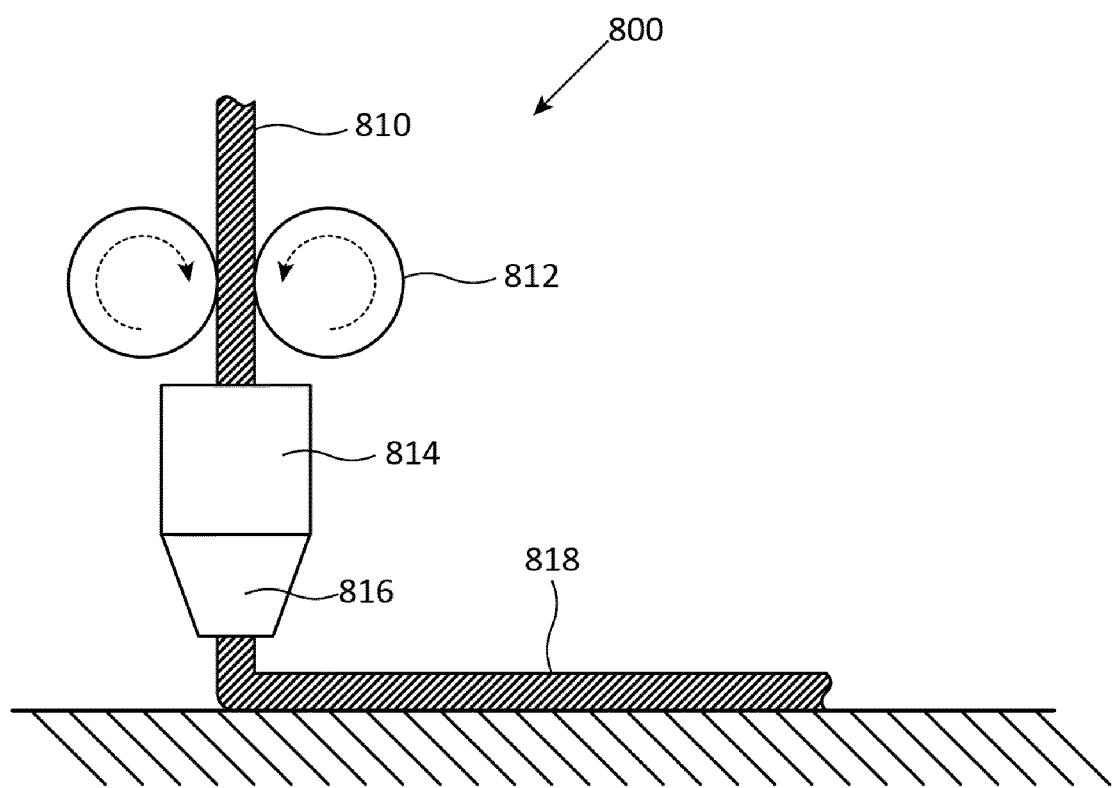
FIG. 8 schematically depicts a typical setup of a 3-D printing process.
Figure 9:
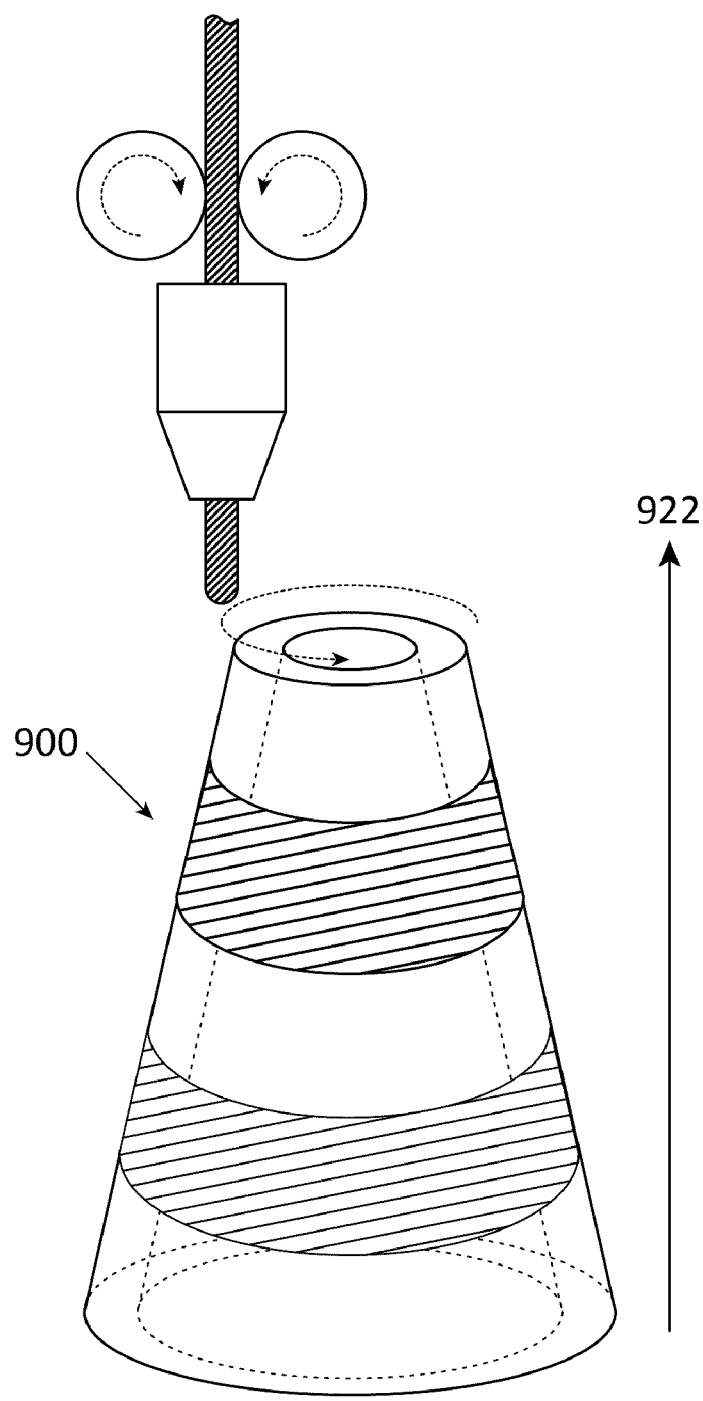
FIG. 9 schematically depicts a method of manufacturing an optical component according to embodiments of the present invention using such a 3-D printing process.

FIG. 8 is used to explain the operation of a fused deposition modeling printer 800. A filament 810 is passed between a pair of driver wheels 812 to a printer head 814 having an output nozzle 816. A layer 818 of the material is deposited while in a high viscosity liquid state, which then cools and cures. In this manner, a 3D structure may be built up as a sequence of layer patterns, e.g. the staggered layers to form the optical component 900, as is schematically depicted in FIG. 9, in which the optical component 900 is manufactured by stacking layers on top of each other from the base to the top of the cone, i.e. in a bottom-up manner, owing to the shape of the optical component 900 although it should be understood that this is by way of non-limiting example only as it is for example equally feasible to manufacture the optical component in a top-down manner for most 3-D shapes of the optical component.

The specific setup of the FDM printer 800 is not particularly limited. For example, the optical component may be printed using an extruder nozzle 816 having two nozzles for producing two separate layers 818, e.g. two layers or a region of higher transmissivity and the first region of a single layer. Alternatively, the optical component may be printed using an extruder nozzle 816 having a first feeder comprising a first material for forming a region of higher transmissivity and a second feeder comprising a second material for forming a first region. During printing, a support on which the optical component is formed may be rotated in order to form the optical component or alternatively the extruded nozzle 816 may be rotated during the 3-D printing of a layer of the optical component to form the 3-D shape of the optical component.

Any suitable material may be used for forming the respective first regions, second regions and third regions. For example, these may be materials suitable for use in a 3-D printing process, e.g. polymers that may be extruded in an FDM printing process. For the first regions, the optical properties of these portions may be tuned by the addition of further materials. For example, in case of a coloured first region, a colourant such as a dye or a pigment may be added to a polymer, in case of a diffusive first region, scattering particles may be added to a polymer, in case of a reflective first region, a reflective coating such as a metal coating may be printed on a surface such as an inner surface of the first region facing the inner volume of the optical component, in case of an emissive first region, a luminescent compound may be added to the polymer, and so on. It is emphasized that these examples are non-limiting examples only and that of the skilled person will have no difficulty using his common general knowledge to find alternative materials that may be used to manufacture, e.g. 3-D print, the respective regions of higher transmissivity and the first regions.

At this point, it is further noted that in some embodiments the layers of the optical component may be made of the same material or combination of materials whereas in alternative embodiments different layers of the optical component may be made of different materials or combinations of materials. For example, as previously explained, different layers may have different first regions and/or may have different regions of higher transmissivity, such that the desired optical properties of the optical component may be tuned by selecting such different materials for different layers.

The optical component according to embodiments of the present invention may be used as part of a luminaire such as a ceiling pendant, a floor-mounted luminaire in which the optical component is positioned on top of a (vertical) pole, and so on. Such a luminaire may further comprise one or more light sources, e.g. point light sources such as LEDs or diffuse light sources such as incandescent, halogen or fluorescent light sources. In case of multiple light sources within the luminaire, the light sources may be individually controllable to further enhance the optical effect that can be achieved by guiding the light generated with the light sources through the optical component. The one or more light sources in the luminaire may be dimmable. In an embodiment, the optical component may be used as a lampshade of the luminaire although it should be understood that embodiments of the optical component are not limited to such use and may be used in any suitable manner. The one or more light sources may be hidden from view by the optical component in normal use. The one or more light sources may be positioned within an inner volume of the optical component or outside an inner volume of the optical component, for example if the desired optical effect is to be created within the inner volume. For example, a plurality of light sources may be arranged on a substrate or carrier in a pattern such that the optical component may be positioned inside the pattern, and wherein the light sources are arranged to couple light into the optical component.

Figure 10:
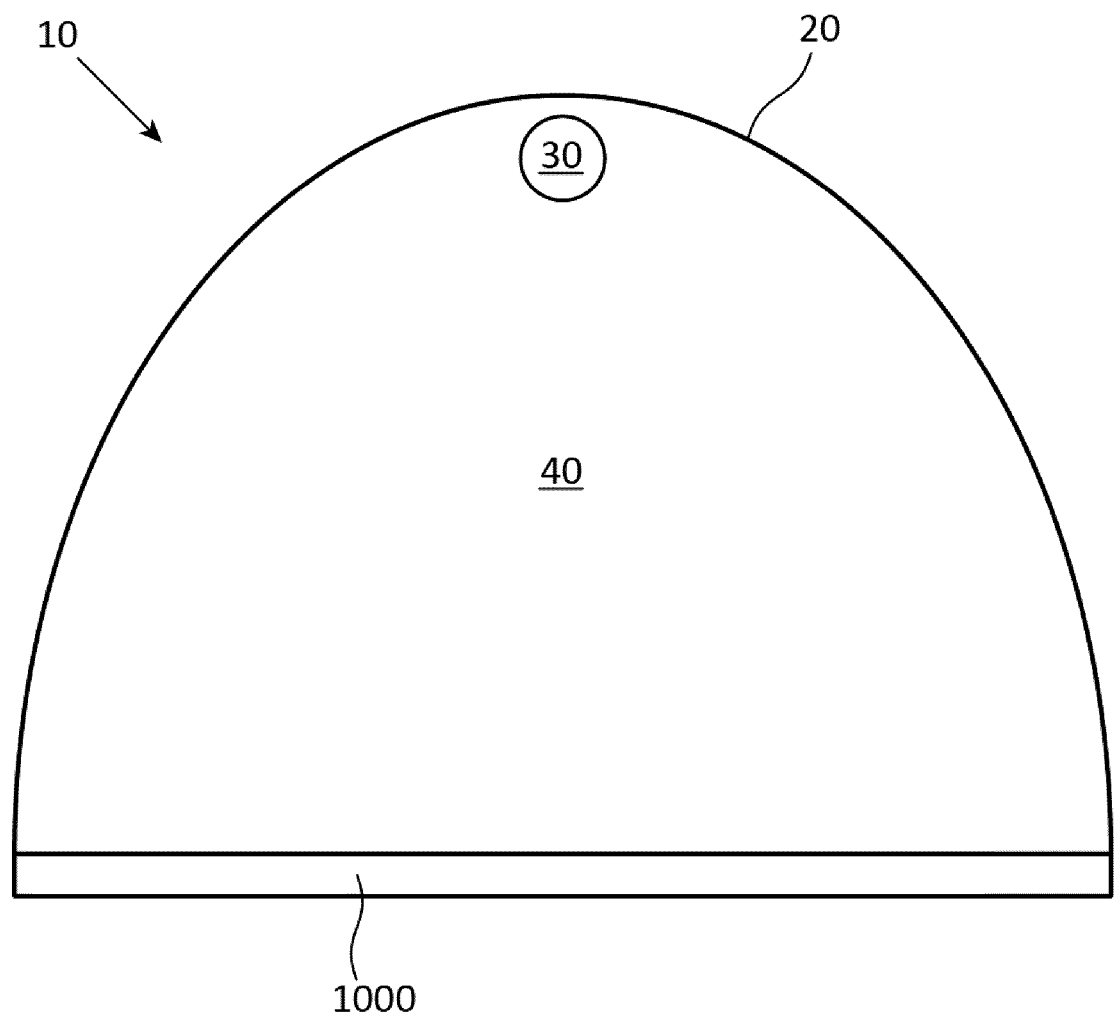
FIGS. 10 and 11 schematically depict luminaires according to example embodiments.
Figure 11:
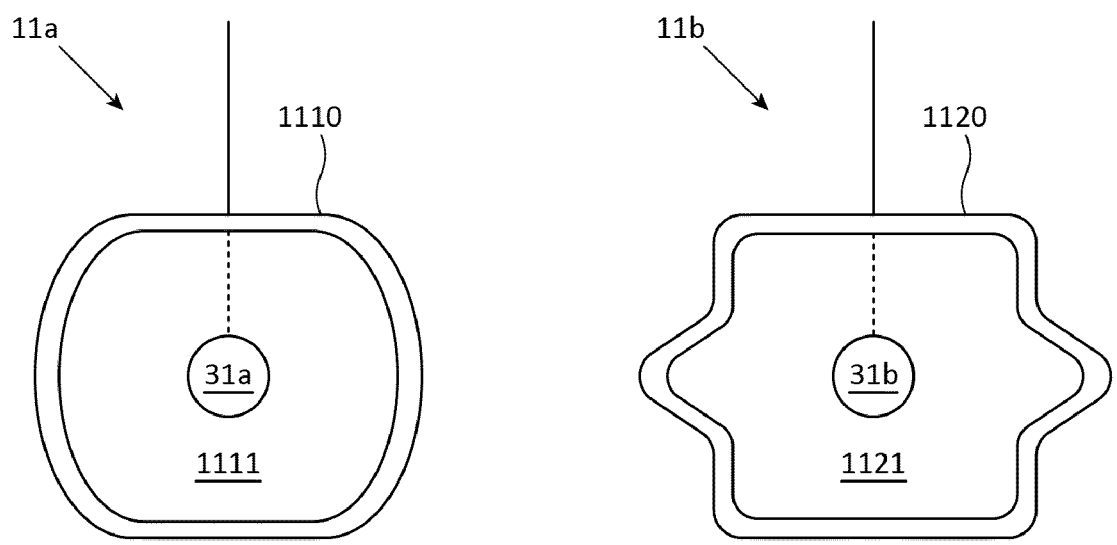

Some example embodiments of luminaires are schematically depicted in FIGS. 10 and 11.

In FIG. 10, the optical component 1000 defines a light exit window of a luminaire 10 in which a light source 30 is mounted proximal to a reflector 20, e.g. a parabolic reflector or the like, for redirecting light emitted by the light source 30 to the light exit window, i.e. the optical component 1000. It will be understood by the skilled person that other optical components may be combined with the optical component 1000 in such a luminaire 1.

FIG. 11 schematically depicts example pendant luminaires 11a and 11b, respectively, in which the optical components 1110 and 1120 have a free-form shape with an inner volume 1111 and 1121, respectively, to illustrate the fact that the optical component according to the present invention may have any suitable shape. Light sources 31a and 31b are located in the inner volumes 1111 and 1121, respectively.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical component having a wall with a first wall surface and a second wall surface, the second wall surface being opposite to the first wall surface in a first direction, the wall comprising a plurality of layers stacked on top of each other in a second direction perpendicular to the first direction,
   wherein each layer of the plurality of layers has a first region with a first edge surface and an opposite second edge surface, both extending through the layer in the second direction, the first edge surface being an interface between the first region and a second region, and the second edge surface being an interface between the first region and a third region, the first region having a lower transmissivity than each of the second region and the third region,
   wherein each first region has a defined width (W1), and
   wherein successive layers are staggered with respect to each other by a distance (D) that is larger than the defined width (W1).

2. The optical component of claim 1, wherein the optical component comprises an inner volume, and wherein each layer envelopes part of the inner volume.

3. The optical component of claim 2, wherein each of the first regions, the second regions and the third regions envelope part of the inner volume.

4. The optical component of claim 1, wherein each layer comprises a first portion in which the second region is proximal to the first wall surface and a second portion in which the first region is proximal to the first wall surface.

5. The optical component of claim 1, comprising an alternating pattern of first parts including the plurality of layers and further transmissive parts.

6. The optical component of claim 1, wherein each first region is individually selected from a coloured portion, a reflective portion, a diffuse portion, an emissive portion and a transparent portion having a different refractive index to the second region and the third region.

7. The optical component of claim 6, wherein the respective first regions are the same.

8. The optical component of claim 1, wherein different layers are made of different materials and/or have different dimensions.

9. A luminaire comprising the optical component of claim 1.

10. The luminaire of claim 9, wherein the optical component comprises an inner volume, the luminaire further comprising a light source positioned inside or outside said inner volume.

11. A method of manufacturing the optical component according to claim 1, wherein the method comprises the step of 3-D printing the plurality of layers with 3-D printer having an extruder nozzle.

12. The method of claim 11, wherein said 3-D printing comprises forming an inner volume of the optical component by enveloping each layer around part of the inner volume.

13. The method of claim 12, wherein said 3-D printing comprises forming each layer such that each layer comprises a first portion in which the second region is proximal to the first wall surface and a second portion in which the first region is proximal to the first wall surface.

* * * * *